(12) United States Patent
Peterson

(10) Patent No.: US 10,584,795 B2
(45) Date of Patent: Mar. 10, 2020

(54) INTERLOCKING AXIAL LABYRINTH SEAL

(71) Applicant: Ross H Peterson, Palm Beach Gardens, FL (US)

(72) Inventor: Ross H Peterson, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 15/472,350

(22) Filed: Mar. 29, 2017

(65) Prior Publication Data

US 2018/0283558 A1    Oct. 4, 2018

(51) Int. Cl.
*F16J 15/447* (2006.01)
*F16C 33/80* (2006.01)

(52) U.S. Cl.
CPC ....... *F16J 15/4472* (2013.01); *F16J 15/4476* (2013.01); *F16C 33/80* (2013.01)

(58) Field of Classification Search
CPC ...... F16J 15/4472; F16J 15/4476; F16J 15/44; F16C 33/80; F16C 33/761
USPC .......................................................... 277/412
See application file for complete search history.

(56) References Cited

U.S. PATENT DOCUMENTS

| | | | | |
|---|---|---|---|---|
| 835,836 A * | 11/1906 | Schulz | ................. | F16J 15/4472 277/419 |
| 937,916 A * | 10/1909 | Bentley | ................. | F16J 15/4476 277/420 |
| 945,180 A * | 1/1910 | Ljungström | ......... | F16J 15/4476 277/419 |
| 1,009,425 A * | 11/1911 | Ljungström | ......... | F16J 15/4476 277/420 |
| 1,689,735 A * | 10/1928 | Losel | .................... | F16J 15/4472 277/419 |
| 1,807,460 A * | 5/1931 | Wiberg | ................ | F16J 15/4472 277/413 |
| 1,848,613 A * | 3/1932 | Flanders | .............. | F16J 15/4472 277/321 |
| 3,630,529 A * | 12/1971 | Ball | ........................ | F04D 7/065 165/73 |
| 3,801,235 A * | 4/1974 | Douglas | .................. | F04B 53/14 277/412 |
| 4,046,388 A * | 9/1977 | Meyer | ..................... | F01D 11/02 277/418 |
| 4,356,700 A * | 11/1982 | Eckels | ....................... | F17C 9/00 277/430 |
| 5,676,472 A * | 10/1997 | Solomon | .............. | B25J 19/0075 277/347 |
| 6,164,655 A * | 12/2000 | Bothien | .................. | F01D 11/02 277/303 |
| 9,506,366 B2 * | 11/2016 | Danescu | ............... | F01D 11/001 |
| 2011/0150640 A1 * | 6/2011 | Tiemann | ............... | F01D 5/3015 415/191 |
| 2011/0272893 A1 * | 11/2011 | Raible | ..................... | F01D 11/02 277/419 |

(Continued)

*Primary Examiner* — Eugene G Byrd
(74) *Attorney, Agent, or Firm* — Koenig IP Works, PLLC

(57) ABSTRACT

An axial assembled interlocking labyrinth seal with a rotor and a stator each having a series of separate spiral shaped teeth with a gap formed on each of the separate teeth, so that the rotor can be rotated within the stator and axially advanced by aligning the gaps of the teeth on the rotor with gaps on the stator so that the axial labyrinth seal can be assembled.

7 Claims, 7 Drawing Sheets

(56) References Cited

U.S. PATENT DOCUMENTS

| | | | |
|---|---|---|---|
| 2011/0280715 A1* | 11/2011 | Garg | F01D 11/001 |
| | | | 415/174.5 |
| 2017/0114655 A1* | 4/2017 | Kim | F01D 11/04 |
| 2017/0321697 A1* | 11/2017 | Beinert | F04C 2/16 |

* cited by examiner

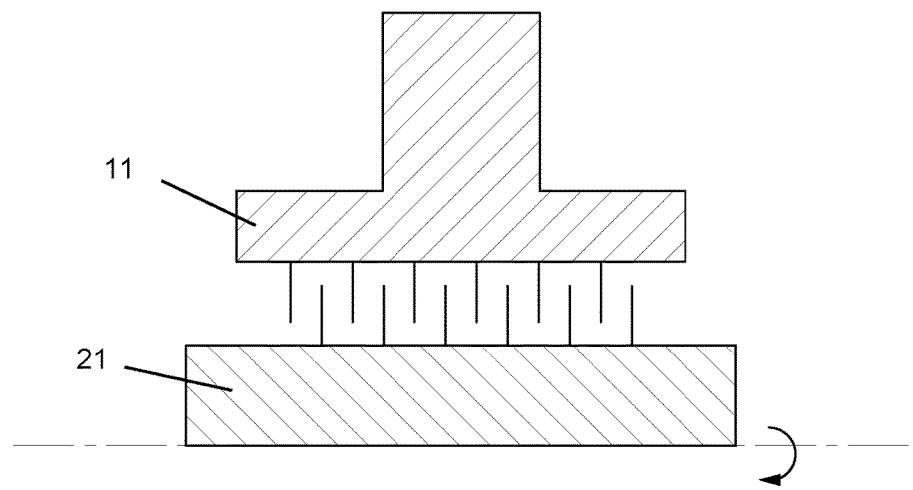
FIG 8
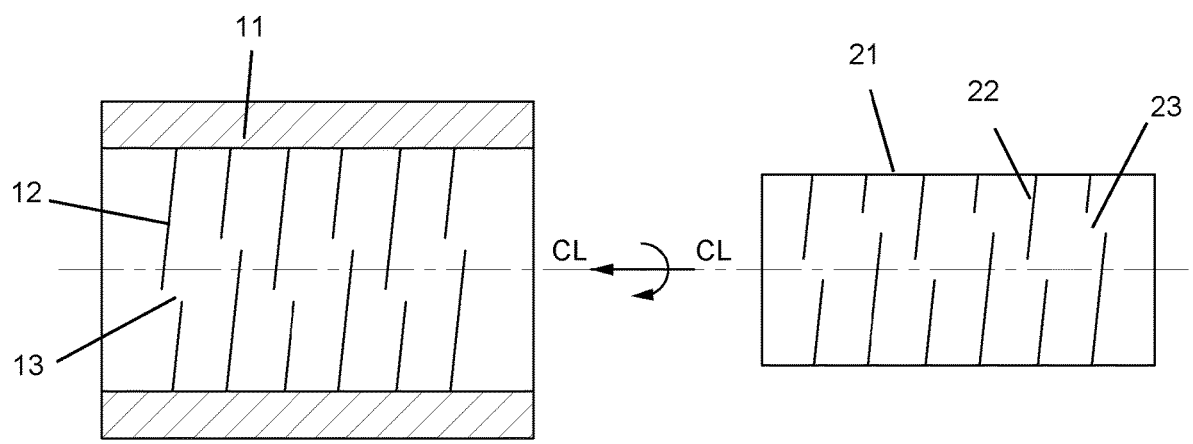
FIG 9
FIG 10

INTERLOCKING AXIAL LABYRINTH SEAL

GOVERNMENT LICENSE RIGHTS

This invention was made with Government support under contract number W31P4Q-09-A-0016 awarded by the United States Army. The Government has certain rights in the invention.

CROSS-REFERENCE TO RELATED APPLICATIONS

None.

BACKGROUND OF THE INVENTION

Field of the Invention

The present invention relates generally to a labyrinth seal, and more specifically to an axial assembled interlocking labyrinth seal

Description of the Related Art Including Information Disclosed Under 37 CFR 1.97 and 1.98

A prior art labyrinth seal has seal teeth on a rotating hardware and a smooth surface (land) on a static structure. This allows for axial installation of the seal without clashing of the hardware. However, a better sealing arrangement is to have seal teeth on both sides known as interlocking labyrinth seal. However, axial assembly is not possible with this design.

BRIEF SUMMARY OF THE INVENTION

An axial assembled labyrinth seal in which the lab seal teeth are machined as a single bolt thread with a double pitch to the next thread. The labyrinth seal can be assembled by turning either the static housing or the rotating hardware to thread the single tooth past the opposing tooth. This continues until all teeth are interlocked on the rotating hardware and static structure.

BRIEF DESCRIPTION OF THE SEVERAL VIEWS OF THE DRAWINGS

FIG. 8 shows a cross section view of the axial labyrinth seal with the interlocking labyrinth seal teeth extending from the stator and the rotor.

FIG. 9 shows a cross section view through a center of the stator of FIG. 8 and its teeth.

FIG. 10 shows a cross section view through a center of the rotor of FIG. 8 and its teeth.

DETAILED DESCRIPTION OF THE INVENTION

Figure 1:
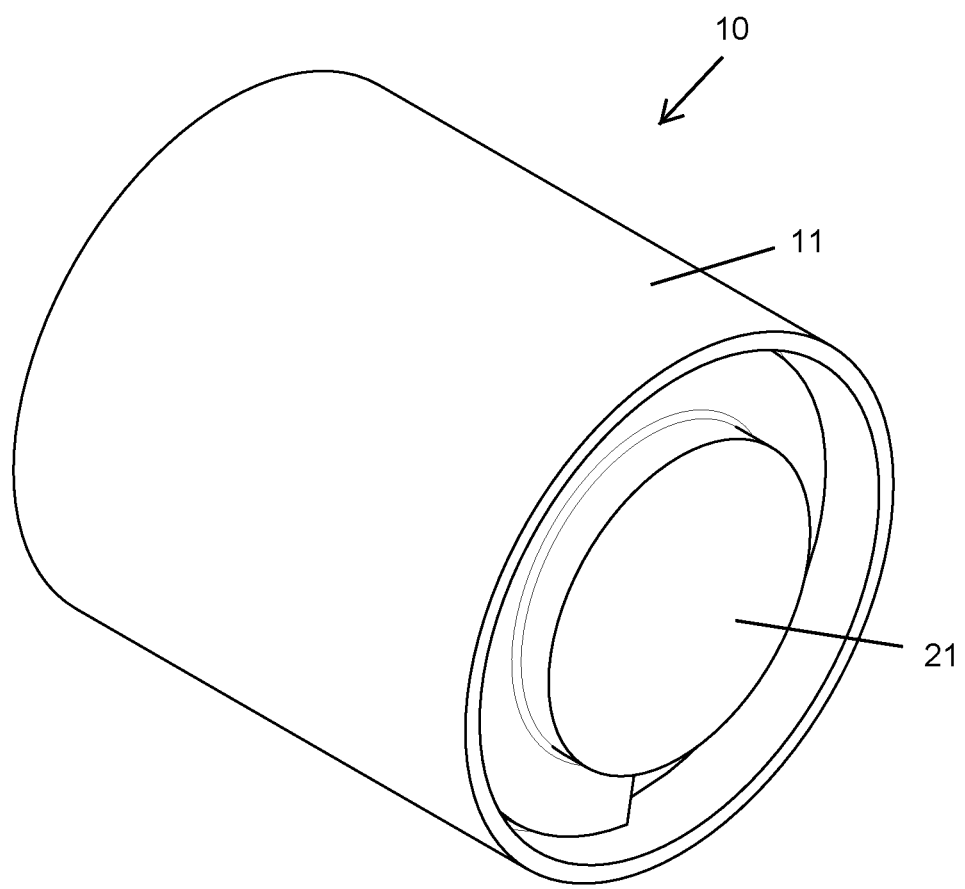
FIG. 1 shows an isometric view of the axial assembled labyrinth seal of the present invention in an assembled position.
Figure 2:
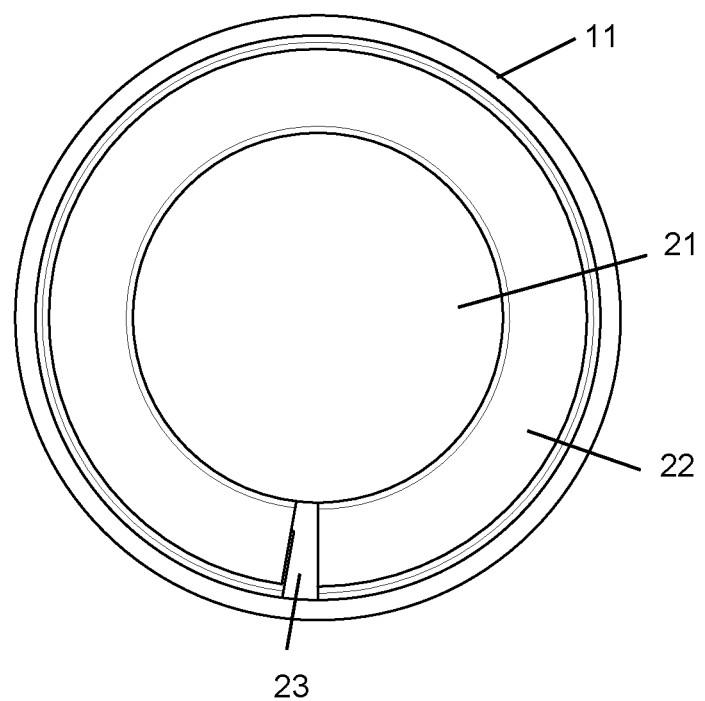
FIG. 2 shows a front view of the axial assembled labyrinth seal of FIG. 1.

The present invention is an interlocking labyrinth seal that can be assembled in an axial direction. FIG. 1 shows the lab seal 10 of the present invention with a static housing 11 and a rotating hardware 21 located inside of the static housing 11. FIG. 2 shows a front view of the lab seal 10 with the spiral shaped teeth 21 of the rotating hardware 21 having a gap 23.

Figure 3:
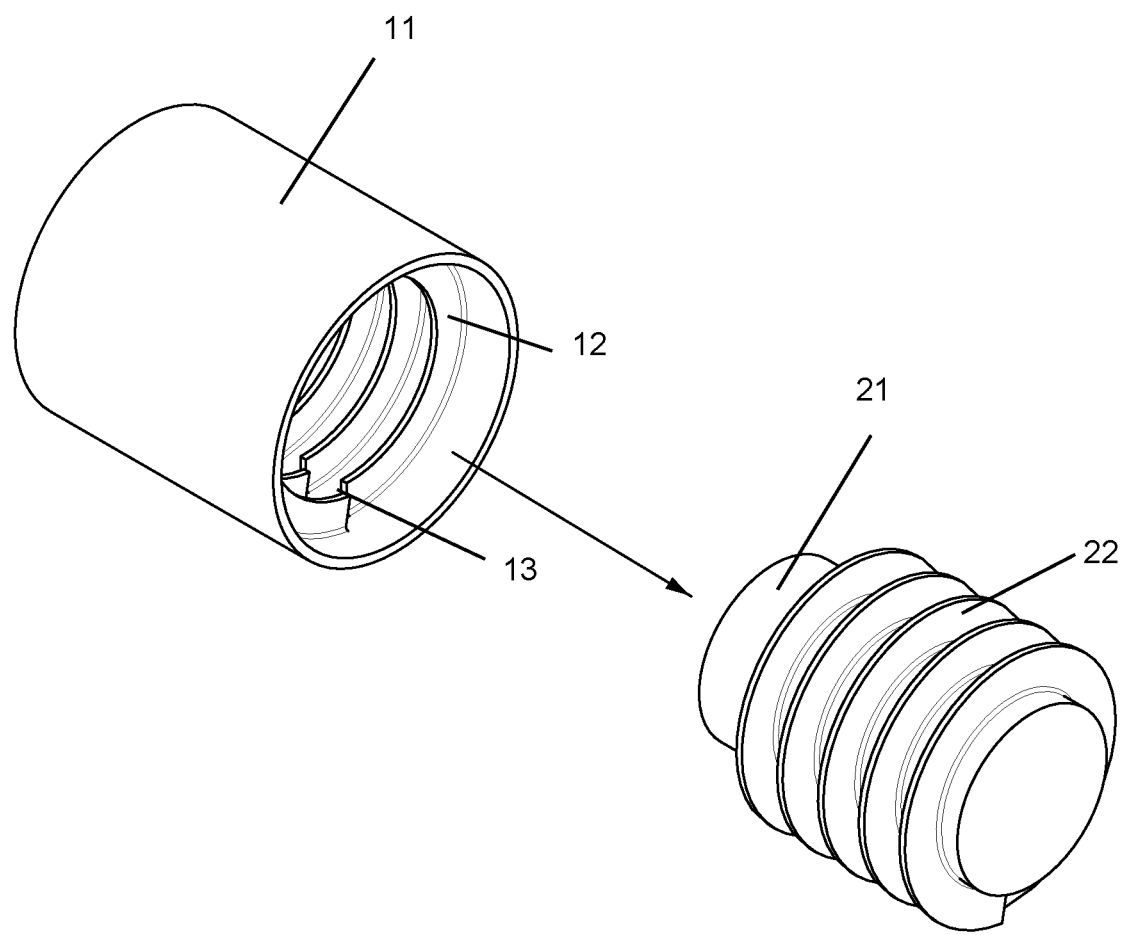
FIG. 3 shows an isometric view of the static housing of the labyrinth seal of FIG. 1.

FIG. 3 shows the static housing 11 with spiral shaped teeth 12 extending inwards with a gap 13 formed between the teeth 12. The rotating hardware 21 is shown outside of the static housing 11 and includes spiral shaped teeth 22 extending outward. Gaps are also present between the spiral teeth 22 but not shown in FIG. 3.

Figure 4:
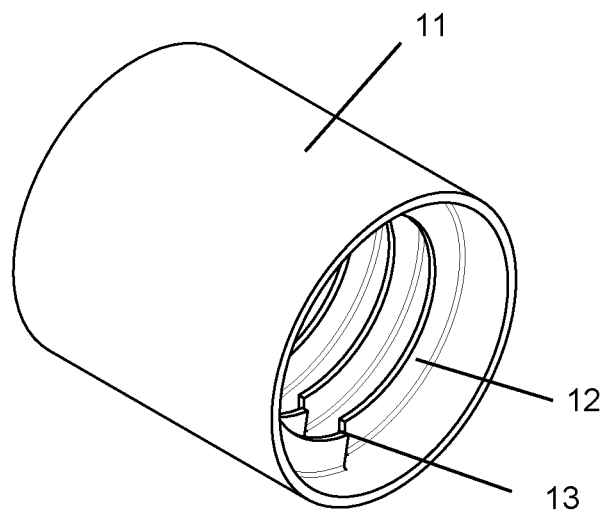
FIG. 4 shows an isometric view of the rotating hardware of the labyrinth seal of FIG. 1.
Figure 5:
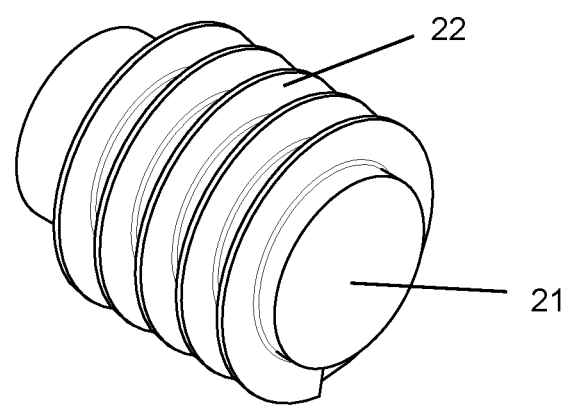
FIG. 5 shows an isometric view of the rotating hardware with of the labyrinth seal of FIG. 1.
Figure 6:
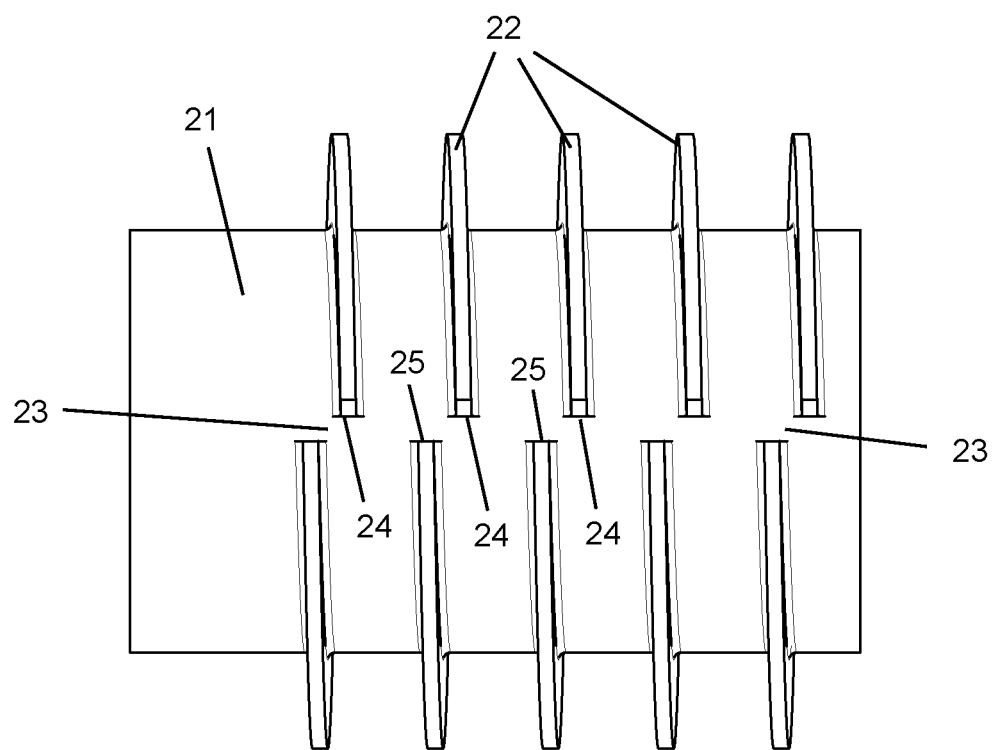
FIG. 6 shows a side view of the rotating hardware with gaps between teeth of the labyrinth seal of FIG. 1.

FIG. 4 shows the static housing 11 with a gap 13 formed between spiral shaped teeth 12. Each of the spiral shaped teeth include a gap 13. FIG. 5 shows the rotating hardware 21 with spiral shaped teeth 21. The teeth 22 of the rotating hardware also have gaps 23. FIG. 6 shows the rotating hardware 21 with the spiral shaped teeth 22 having gaps 23. Each of the spiral shaped teeth 22 have a forward end 24 and an aft end 25 in which the gap 23 is formed.

Figure 7:
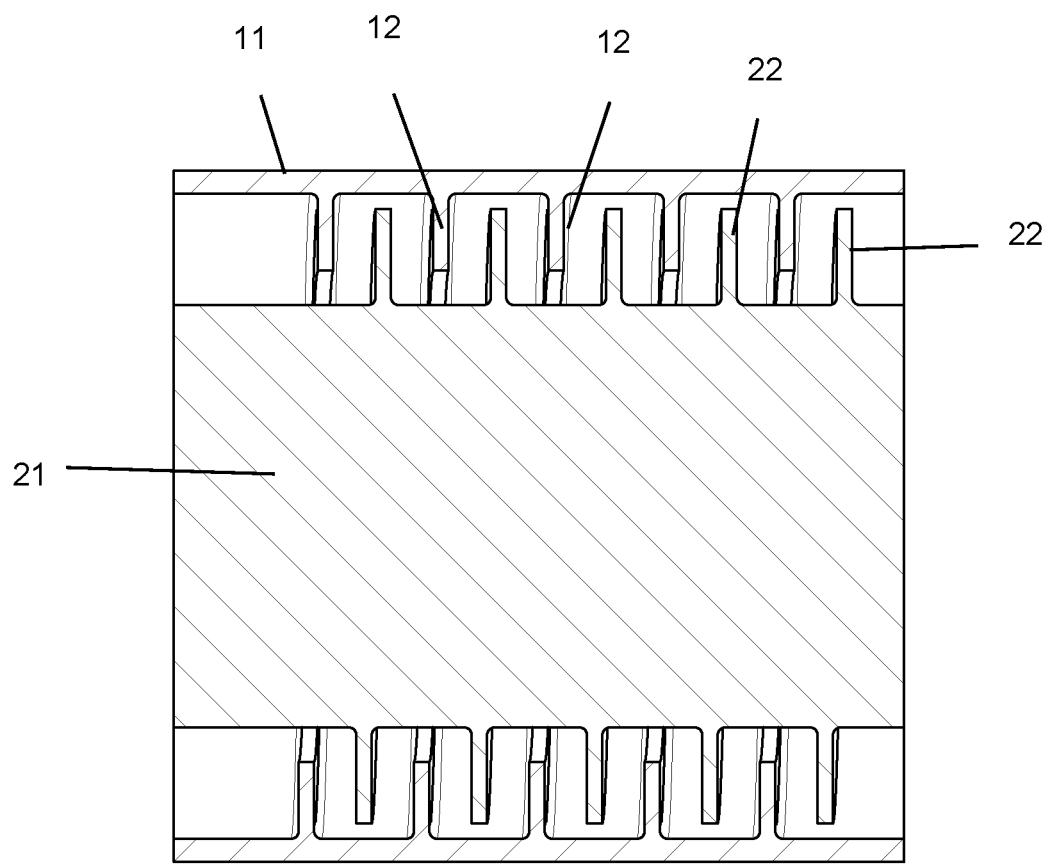
FIG. 7 shows a cross section view through the labyrinth seal of FIG. 1 with the teeth of the static housing and the rotating hardware.

The lab seal teeth 12 and 22 of both static and rotating pieces are machined as a single thread with a plus 2 pitch between threads or a large enough pitch that prevents clashing of teeth due to rotor travel. FIG. 7 shows a cross section cutaway view of an assembled interlocking axial assembled labyrinth seal of FIG. 1. The threads 12 and 22 of the static and rotating pieces are shown in relation to one another. The shape and arrangement of the teeth 12 and 22 allow for the labyrinth seal to be assembled in an axial direction. The rotating hardware would be inserted into the static housing and rotated until the end of the first tooth 22 could be inserted into the gap 13 between the first tooth 12 of the static hardware 11. This process would be repeated for each of the remaining teeth until the labyrinth seal is completely assembled. Because of the double pitch of the teeth, rotation of the rotating hardware teeth 22 within the static teeth 12 of the static hardware 11 would not make contact. The relative rotation of the teeth 12 and 22 would improve on the sealing capability of the labyrinth seal since the rotating teeth 22 would act to force air in the direction of the spiraling of the teeth 22.

FIG. 8 shows a cross section view of the axial assembled labyrinth seal with the stator 11 and the rotor 21 with the interlocking labyrinth seal teeth extending from each. The stator 11 has teeth that extend radial inward. The rotor 21 has teeth that extend radial outward. FIG. 9 shows the stator 11 with a series of spiral shaped teeth 123 having a gap 13 formed between a forward end and an aft end of each of the teeth. FIG. 10 shows the rotor 21 with a series of spiral shaped teeth 22 extending outward with a gap 23 formed between each of the teeth. In the FIGS. 9 and 10 embodiment, the gaps 13 in the stator 11 and the gaps 23 in the rotor 21 are offset from adjacent gaps as seen. The gaps 13 in the rotor alternate across a center line CL in order that the gaps do not form a straight through gap for leakage flow. This design forms a serpentine passage across the alternating gaps such that leakage flow is reduced. The rotor 21 also has gaps 23 that alternate.

I claim the following:

1. An interlocking axial labyrinth seal comprising:
   a static housing with a plurality of spiral shaped teeth extending radially inward from the static housing;
   a rotating hardware with a plurality of spiral shaped teeth extending radially outward;
   a diameter of the spiral shaped teeth of the rotating hardware is greater than a diameter of the spiral shaped teeth of the static housing such that an interlocking axial labyrinth seal is formed;
   the spiral shaped teeth of the static housing and the rotating hardware each having a gap between teeth; and,
   the spiral shaped teeth and the gaps are of such shape and position that the interlocking labyrinth seal can be assembled in an axial direction along a rotational axis of the labyrinth seal.

2. The interlocking axial labyrinth seal of claim 1, and further comprising:
   the gaps between the teeth are aligned along a longitudinal axis of the labyrinth seal.

3. The interlocking axial labyrinth seal of claim 1, and further comprising:
   the gaps between the teeth are alternating above and below a centerline of the labyrinth seal.

4. A process for assembling an axial labyrinth seal comprising the steps of:
   forming a stator with a plurality of separate spiral shaped radial inward extending teeth with each teeth having a gap formed between a forward end of the tooth and an aft end of the radial inward extending tooth;
   forming a rotor with a plurality of separate spiral shaped radial outward extending teeth with each teeth having a gap formed between a forward end and an aft end of the radial outward extending tooth;
   inserting the rotor within the stator such that the gap of the first tooth on the rotor align with the gap of the first tooth on the stator;
   rotating the rotor within the stator until the gap of the second tooth on the rotor align with the gap of the second tooth on the stator;
   rotating the rotor within the stator until the gap of the third tooth on the rotor align with the gap of the third tooth on the stator; and,
   repeating the rotation of the rotor within the stator with the gaps in alignment until the axial labyrinth seal is assembled.

5. An interlocking axial labyrinth seal comprising:
   a static housing with a plurality of spiral shaped teeth extending radially inward from the static housing;
   a rotating hardware with a plurality of spiral shaped teeth extending radially outward;
   the spiral shaped teeth of the static housing and the rotating hardware each having a gap between teeth;
   the spiral shaped teeth and the gaps are of such shape and position that the interlocking labyrinth seal can be assembled in an axial direction along a rotational axis of the labyrinth seal; and,
   the spiral shaped teeth of both the rotating hardware and the static housing form an interlocking axial labyrinth seal.

6. The interlocking axial labyrinth seal of claim 1, and further comprising:
   both the spiral shaped teeth of the rotating hardware and the static housing have tips; and,
   the tips of the spiral shaped teeth on the rotating hardware are at a greater diameter than the tips of the spiral shaped teeth on the static housing.

7. The interlocking axial labyrinth seal of claim 5, and further comprising:
   both the spiral shaped teeth of the rotating hardware and the static housing have tips; and,
   the tips of the spiral shaped teeth on the rotating hardware are at a greater diameter than the tips of the spiral shaped teeth on the static housing.

* * * * *